(12) United States Patent
Rodriguez et al.

(10) Patent No.: US 11,198,342 B1
(45) Date of Patent: Dec. 14, 2021

(54) TRAILER HITCH PROTECTOR

(71) Applicants: Efrain Rodriguez, Adger, AL (US);
Vanessa Rodriguez, Adger, AL (US)

(72) Inventors: Efrain Rodriguez, Adger, AL (US);
Vanessa Rodriguez, Adger, AL (US)

(*) Notice: Subject to any disclaimer, the term of this patent is extended or adjusted under 35 U.S.C. 154(b) by 248 days.

(21) Appl. No.: 16/448,345

(22) Filed: Jun. 21, 2019

(51) Int. Cl.
*B60D 1/60* (2006.01)
*B60R 21/34* (2011.01)

(52) U.S. Cl.
CPC ............ *B60D 1/60* (2013.01); *B60R 21/34* (2013.01); *B60R 2021/346* (2013.01)

(58) Field of Classification Search
CPC .... B60D 1/60; B60D 1/605; B60R 2021/343; B60R 2021/346; B60B 2021/343; B60B 2021/346
See application file for complete search history.

(56) References Cited

U.S. PATENT DOCUMENTS

| 6,039,339 | A | 3/2000 | Bello | |
| 6,260,874 | B1* | 7/2001 | Smith | B60D 1/60 280/507 |
| 2011/0285104 | A1* | 11/2011 | Wotherspoon | B60R 3/007 280/164.1 |
| 2012/0235383 | A1* | 9/2012 | Hanes, Jr. | B60D 1/60 280/507 |
| 2020/0016947 | A1* | 1/2020 | Taylor | B60D 1/60 |

* cited by examiner

*Primary Examiner* — Minnah L Seoh
*Assistant Examiner* — Hosam Shabara
(74) *Attorney, Agent, or Firm* — Sanchelima & Associates, P.A.; Christian Sanchelima; Jesus Sanchelima

(57) ABSTRACT

The present invention is a trailer hitch protector. The trailer hitch protector comprises a supporting bar adapted to be mounted to a rear of a vehicle. The trailer hitch protector further comprises a protective structure supported from the supporting bar and extending rearwardly from the supporting bar. The trailer hitch protector further a ball hinge cover made of compressible material and fixed to the protective structure, the ball hinge cover adapted to accommodate a ball element of a trailer hitch of the vehicle.

13 Claims, 3 Drawing Sheets

TRAILER HITCH PROTECTOR

BACKGROUND OF THE INVENTION

1. Field of the Invention

The present disclosure relates generally to a vehicle's trailer hitch accessory, and particularly relates to a trailer hitch protector that acts as a safety guard for protecting a trailer hitch and further any personnel from accidental contact with exposed parts of the trailer hitch to prevent injury thereby.

2. Description of the Related Art

Vehicles installed with trailer hitch for allowing towing of trailers therewith have increased in popularity in recent decades. Trailer hitch on the back of vehicles allows a trailer to be hooked up to the back of the vehicle and allows the transport of the trailer. Vehicle trailer hitch generally comprises a tow bar tongue and trailer hitch ball. Such trailer hitch is typically not removed after a trailer has been unhitched from the vehicle. Instead, the trailer hitch assembly remains physically in place at the lower rear end of the vehicle. The presence of the trailer hitch assembly presents an obstacle to a person's freely moving around the rear end of the vehicle as it extends rearwardly away from the vehicle a substantial distance therefrom. The obstacle presented by the trailer hitch assembly can injure a person, typically in the shin and/or knee regions, for example, when a person may be trying to mount the vehicle trunk for rear thereof.

As such, providing the vehicle's trailer hitch with some cushioning safety guard or the like is desirable. Applicant believes that a related application corresponds to U.S. Pat. No. 6,039,339 ('339 patent) which discloses a cushioning device for a trailer hitch, which includes an opening capable of fitting onto a tow ball of a vehicle, with protrusions extending away from its body and toward nearby parts of the vehicle or tow bar, exerting pressure against those parts, the rest of the body extending beyond all of the tow ball's outer perimeters thereby providing protection to passersby against accidental injury and enhanced visibility at all times, even when hitched.

While the prior-art hitch protectors, such as the cushioning device of '339 patent may provide a measure of cushioning to a trailer hitch assembly, further improvements are still desirable. For example, it would especially be desirable if the entire protector could be positioned onto the tow bar tongue without disassembly of the hitch ball and yet provided increased measure of cushioning. It is towards providing such improvements that the present invention is directed.

Other documents describing the closest subject matter provide for a number of more or less complicated features that fail to solve the problems described above in an efficient and economical way. None of the documents suggest the novel features of the present invention.

SUMMARY OF THE INVENTION

It is one of the main objectives of the present invention to provide a trailer hitch protector to cover ball element of the trailer hitch while protecting persons by preventing accidently injury due to contact therewith.

It is another objective of the present invention to provide a trailer hitch protector which is adapted to varied size and shapes of ball elements of different vehicle's trailer hitch.

It is yet another objective of the present invention to provide a trailer hitch protector which is inexpensive, simple to install, effective for preventing injuries and that requires minimum maintenance.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
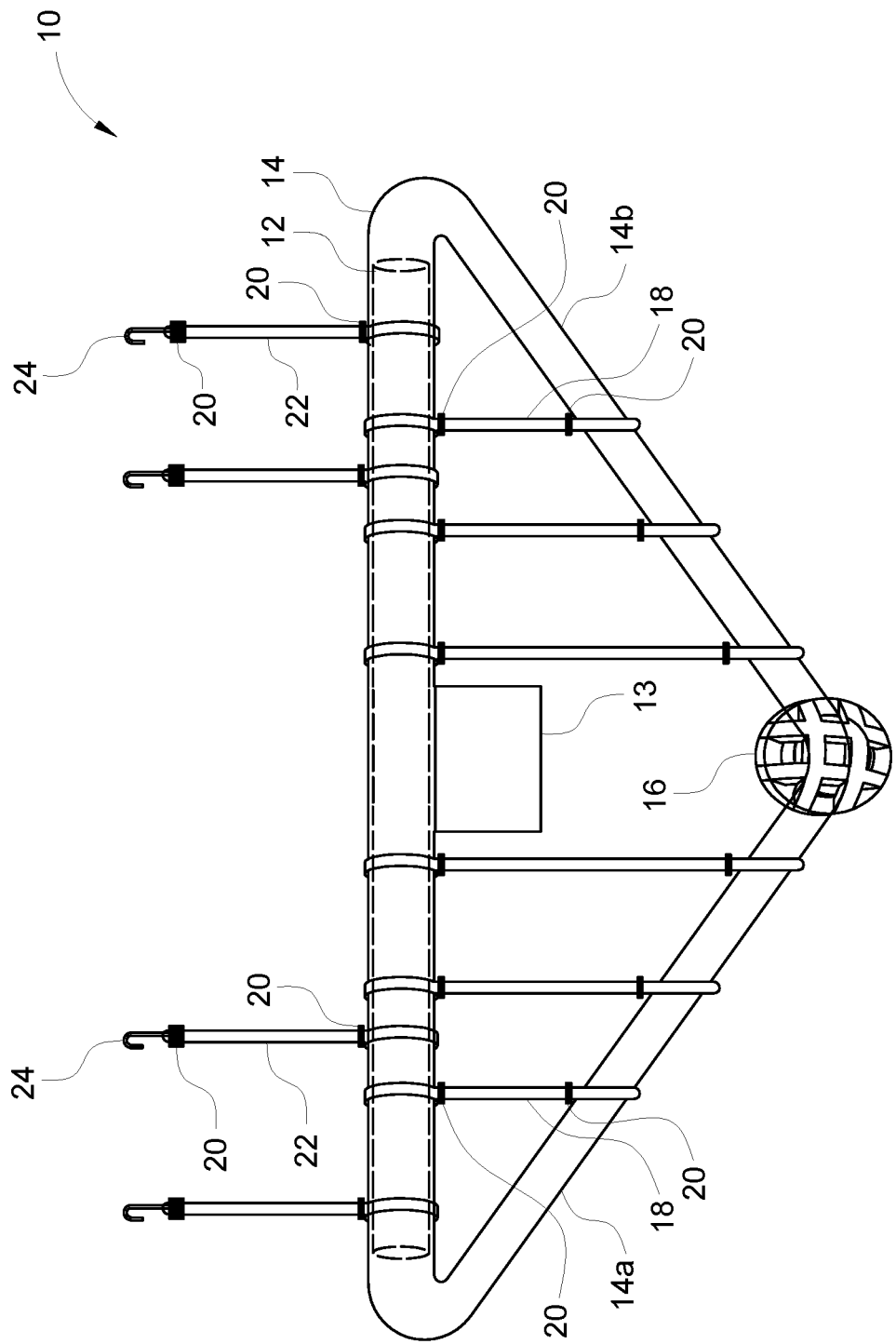
FIG. 1 illustrates a diagrammatic perspective view of a trailer hitch protector 10, in accordance with one or more embodiments of the present invention.

Referring to the drawings, FIG. 1 illustrates a diagrammatic view of a trailer hitch protector (generally referred by the numeral 10), in accordance with various embodiments of the present disclosure. The trailer hitch protector 10 of the present disclosure is designed to be used mainly with the part of a trailer hitch, also known as towing assembly, attached to a towing vehicle and is generally configured to protect the hitch structure of trailer hitch of the towed vehicle. As illustrated in FIG. 1, the trailer hitch protector 10 generally includes a supporting bar 12, a protective structure 14 and a ball hinge cover 16 which are arranged to form a generally triangular structure, and is implemented to be incorporated with and fitted over a trailer hitch of a vehicle.

Figure 2:
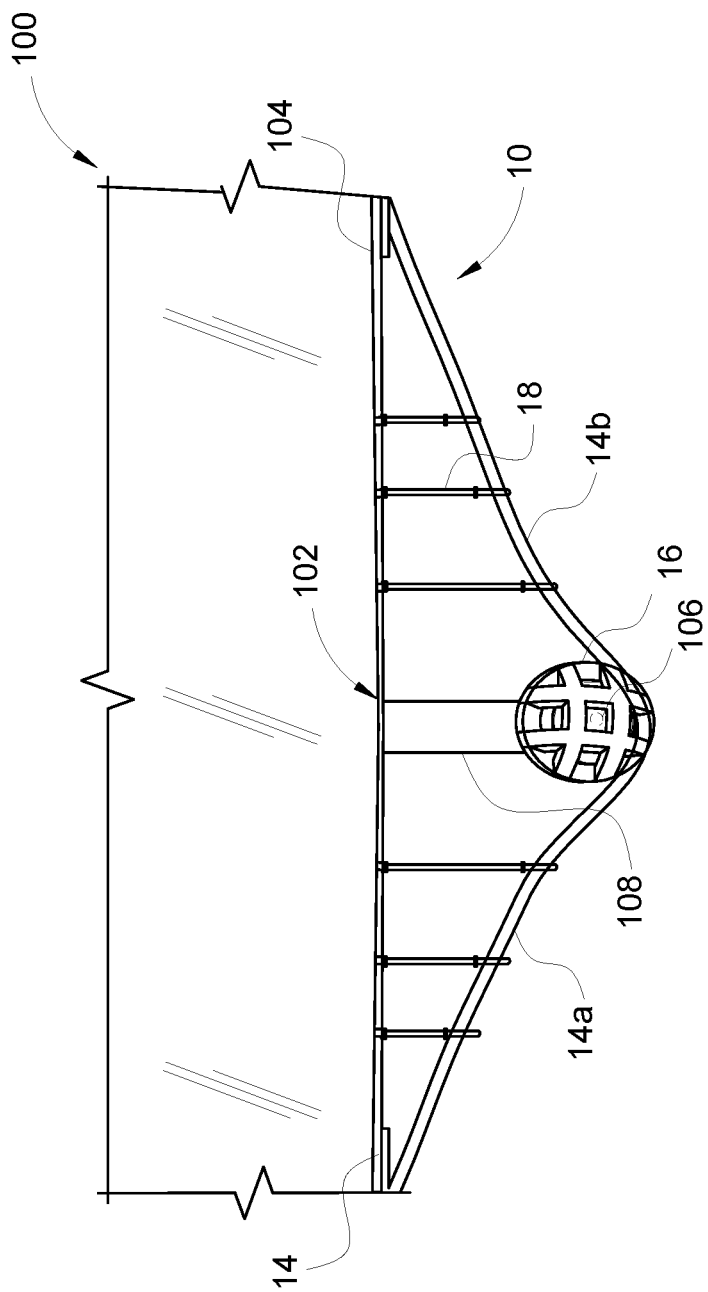
FIG. 2 illustrates a diagrammatic top planar view of the trailer hitch protector 10 being installed on a vehicle 100, in accordance with one or more embodiments of the present invention.
Figure 3:
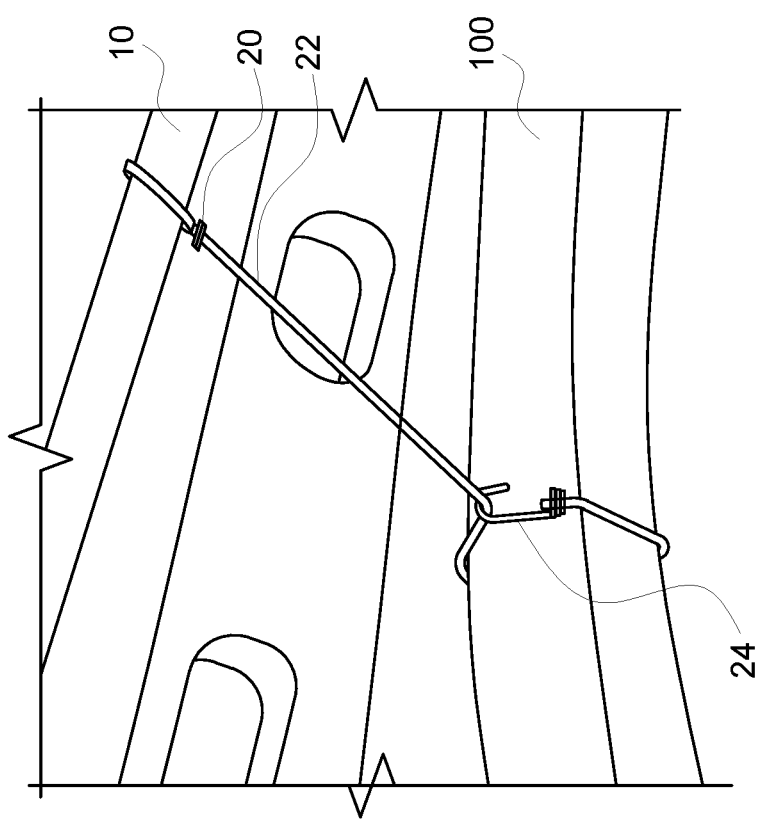
FIG. 3 illustrates a diagrammatic bottom perspective view of the trailer hitch protector 10 being installed on the vehicle 100, in accordance with one or more embodiments of the present invention.

Referring to FIGS. 2-3, as depicted, the trailer hitch protector 10 of the present disclosure is implemented with a vehicle 100, and in particular, is designed to be used with a trailer hitch 102, also sometimes known as tow bar assembly, of the vehicle 100. For purposes of the present disclosure, the trailer hitch 102, refers only to the male portion of the device that couples the two vehicle 100 to a trailer, and the male portion is structurally connected to the tow vehicle 100 (although the connection may not be permanent), and in particular rear bumper 104 of the vehicle 100. The trailer hitch 102 commonly comprises a ball element 106 with which the female coupling element units to join the vehicle 100 and the trailer. The ball element 106 is commonly made of steel and is connected by its proximal end to one or more structural elements of the tow vehicle 100 by a connecting bar 108 and extends generally from the bottom of rear bumper of the vehicle 100, about 12 to 24 inches. Generally, the ball element is 106 from 8 to 24 inches above ground level, most commonly 10 to 15 inches.

As illustrated in FIG. 1, the supporting bar 12 is generally a straight bar which may easily be fixedly mounted to a structure of a vehicle, such as the vehicle 100. The supporting bar 12 is generally of cylindrical shape, with sufficient length to be arranged with and fixed to a trailer hitch, such as the trailer hitch 102 of the vehicle 100. The supporting bar 12 may be made of any suitable metallic material, including, but not limited to, steel, steel alloys, etc. Although the supporting bar 12 has been described to be made of metallic material, it may be appreciated that in some examples it may be made of other suitable materials, including hard plastic, without departing from the scope of the present disclosure. The supporting bar 12 may be fixed to the vehicle 100 for any suitable fastening means. In some examples, the supporting bar 12 may be welded to the rear of the vehicle for permanent and secure attachment thereof. In some examples, a square slot 13 may be provided to help mount the supporting bar 12 to the vehicle 100.

Also, as illustrated, the protective structure 14 is generally triangular in shape. The protective structure 14 is generally formed of a rubber tubing, molded and set to take generally triangular form. The said rubber tubing may be hollow cylindrical tubing as well known in the art. It may be appreciated from FIG. 1, the protective structure 14 may have two arms, a first arm 14a and a second arm 14b which are angled with respect to each other and are both merging towards each other from one of their ends (proximal to the ball hinge cover 16), and are mounted to the supporting bar 12 at its respective opposite ends from their other ends. It may be contemplated that the rubber tubing of the protective structure 14 may be slipped over the ends of the supporting bar 12 for mounting therewith. As illustrated, the rubber tubing of the protective structure 14 may cover the entire supporting bar 12. In other examples, the rubber tubing of the protective structure 14 may only partially cover the supporting bar 12. Further, as illustrated, the two arms 14a and 14b may be connected at merging ends thereof to impart the triangular shape to the protective structure 14. In some examples, the two arms 14a and 14b may not be connected within the scope of the present disclosure.

Also, as seen from FIG. 1, the protective structure 14 includes a webbing of supporting arms 18 which may extend from the arms 14a, 14b and extend to be tightly fixed to the supporting bar 12. It may be appreciated that these supporting arms 18 may help to impart and maintain the triangular structure of the protective structure 14. Further, the supporting arms 18 may provide structural strength to the protective structure 14. In the present examples, the supporting arms 18 may be crimped to the arms 14a, 14b of the protective structure 14 from one of their ends and further crimped to the portion of the protective structure 14 over the supporting bar 12 from other of their ends. For such crimping purpose, the supporting arms 18 may utilize ties (generally referred by the numeral 20), as known in the art. However, it may be appreciated that any other suitable tight fixing means may be alternatively utilized.

Further, as illustrated, the ball hinge cover 16 may be supported between the two arms 14a, 14b at their merging ends, that is at the apex or peak of the triangular structure of the protective structure 14. The ball hinge cover 16 is manufactured as a meshed-form spherical structure. The ball hinge cover 16 is configured to be opened from a portion thereof, like a clamshell, to allow insertion and accommodation of a ball element, such as the ball element 106 of the trailer hitch 102. It may be appreciated that such opening of the ball hinge cover 16 may be achieved by providing a hinge like arrangement of the spherical structure of the ball hinge cover 16. The opening of the ball hinge cover 16 may be expandable opening capable of fitting over the ball element 106. It may be appreciated that the opening of the ball hinge cover 16 may be adapted to varied size and shapes of the ball element, such as the ball element 106 of the trailer hitch 102 of the vehicle 100.

The ball hinge cover 16, preferably, has a shock absorbing body. In one or more examples, the ball hinge cover 16 may be manufactured from a compressible material, such as, but not limited to, vinyl covered foam rubber. The material from which the ball hinge cover 16 is fabricated resists damage from inadvertent contact with other vehicles or objects, resist damage from weathering and/or UV exposure and retains its resilience or compressibility when accidentally bumped or hit. In this regard, virtually any durable elastomeric material may be employed in the practice of the present invention. For example, synthetic rubbers such as EPDM rubbers, polychloroprene rubbers, chlorosulphonated polyethylene rubbers, thermoplastic elastomers and the like may be satisfactorily employed.

Further, as illustrated in FIG. 1, the trailer hitch protector 10 includes one or more elastomeric cords 22 fixed to and extending from the supporting bar 12. As may be seen, the elastomeric cords 22 may be fixed to the supporting bar 12 by crimping thereof, using ties (similar to ties 20) or the like. In the present examples, the trailer hitch protector 10 may employ four number of elastomeric cords 22 for proper mounting of the supporting bar 12. As depicted in FIG. 3, each of the elastomeric cords 22 may extend downwards from the supporting bar 12 towards any supporting member of the chassis of the vehicle 100. Herein, the elastomeric cord 22 may be tightly wrapped around, encircling the supporting member of the chassis of the vehicle 100. The elastomeric cords 22 may be provided with hook elements 24 which may be coupled to the encircling elastomeric cord 20, in order to complete the loop around the supporting member of the chassis of the vehicle 100. Such an arrangement provide tension and helps to rigidly fix the supporting bar 12 to the vehicle 100.

As illustrated in FIG. 2, the trailer hitch protector 10 is mounted over the trailer hitch 102 of the vehicle 100. The supporting bar 12 is fixedly mounted to the rear of the vehicle 100 and the protective structure 14 is extending outwardly therefrom, or specifically rearward with respect to the vehicle 100, such that the ball hinge cover 16 is wrapping around the ball element 106 of the trailer hitch 102. In one or more examples, the trailer hitch protector 10 is designed with the supporting bar 12 being about 36 inches in length, the square slot being about 2.25 inches in length, the elastomeric cords 20 being about 10 inches in length, and the ball hinge cover 16 being about 5 inches in diameter. Thereby, the trailer hitch protector 10 helps to cover ball element of the trailer hitch while protecting persons by preventing accidently injury due to contact therewith. The trailer hitch protector 10 of the present disclosure is inexpensive, simple to install, effective for preventing injuries and requires minimum maintenance.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:

1. A trailer hitch protector, comprising:
   a supporting bar adapted to be mounted to a rear of a vehicle;
   one or more cords to rigidly mount the supporting bar to a rear of a vehicle,
   a protective structure made of rubber tubing supported from the supporting bar and extending rearwardly from the supporting bar; and
   a ball hinge cover made of compressible material and fixed to the protective structure, the ball hinge cover adapted to accommodate a ball element of a trailer hitch of the vehicle.

2. The trailer hitch protector of claim 1, wherein the supporting bar is a cylindrical metal bar.

3. The trailer hitch protector of claim 1, wherein the protective structure is triangular in shape.

4. The trailer hitch protector of claim 1, wherein the ball hinge cover is spherical in shape with an opening to accommodate the ball element.

5. The trailer hitch protector of claim 1, wherein the ball hinge cover is meshed structure.

6. The trailer hitch protector of claim 1 further comprising supporting arms extending between the supporting bar and the protective structure.

7. The trailer hitch protector of claim 1, wherein each of the one or more elastomeric cords is provided with a hook element to tightly wound the corresponding elastomeric cord to the rear of a vehicle.

8. A trailer hitch protector, comprising: a supporting bar; one or more elastomeric cords to rigidly mount the supporting bar to a rear of a vehicle; a protective structure triangular in shape and made of rubber tubing, the protective structure supported from the supporting bar and extending rearwardly from the supporting bar, the protective structure comprises two arms, a first arm and a second arm which are angled with respect to each other and are both merging towards each other from one of their ends; supporting arms extending between the supporting bar and the protective structure; and a ball hinge cover made of compressible material and fixed to the protective structure, the ball hinge cover spherical in shape with an opening adapted to accommodate a ball element of a trailer hitch of the vehicle.

9. The trailer hitch protector of claim 8, wherein said protective structure includes supporting arms.

10. The trailer hitch protector of claim 9, wherein said supporting arms extend from the two arms to the supporting bar.

11. The trailer hitch protector of claim 9, wherein said supporting arms are attached to the two arms and to the supporting bar using ties.

12. The trailer hitch protector of claim 8, wherein said elastomeric cords are fixed to the supporting bar by crimping thereof, using ties.

13. The trailer hitch protector of claim 8, wherein said ball hinge is made of vinyl covered foam rubber.

* * * * *